United States Patent [19]

Ishibashi et al.

[11] Patent Number: 5,031,167
[45] Date of Patent: Jul. 9, 1991

[54] FOCUS ERROR DETECTION SYSTEM FOR AN OPTICAL RECORDING/REPRODUCING SYSTEM

[75] Inventors: Hiromichi Ishibashi, Toyonaka; Shinichi Tanaka, Kyoto; Akira Matsubara, Takatsuki; Tsuyoshi Okada, Yokohama, all of Japan

[73] Assignee: Matsushita Electric Industrial Co., Ltd., Osaka, Japan

[21] Appl. No.: 356,368

[22] Filed: May 24, 1989

[30] Foreign Application Priority Data

May 26, 1988 [JP] Japan .................... 63-128962
May 26, 1988 [JP] Japan .................... 63-128963

[51] Int. Cl.$^5$ .................... G11B 7/00; G11B 5/09
[52] U.S. Cl. .................... 369/44.34; 369/44.11; 369/44.41; 369/51
[58] Field of Search .................... 369/44.11, 44.41, 44.42, 369/44.34, 120, 51, 50, 59, 54; 365/183, 45; 375/120

[56] References Cited

U.S. PATENT DOCUMENTS 4,025,784 5/1977 Lehureau et al. .................... 369/44.11
4,051,527 9/1977 Braat .................... 369/120
4,562,564 12/1985 Bricot et al. .

Primary Examiner—Roy N. Envall, Jr.
Assistant Examiner—N. Hindi
Attorney, Agent, or Firm—Wenderoth, Lind & Ponack

[57] ABSTRACT

An apparatus is described for recording/reproducing to/from an optical record carrier by means of a laser light beam. The record carrier has pre-recorded sarvo marks aligned in a track. In order to get a focus error signal, the apparatus measures phase difference between signals from two photo sensor elements which receive the laser light beam through the record carrier. A circuit for measuring the phase difference has a first and a second phase shift circuits, RS flip-flops and a focus error converter which has a shift register and a low-pass filter. The signals from the photo sensor elements are fed to the first and second phase shift circuits, respectively. The second phase shift circuit is composed of a plurality of delay elements, output of which are fed to the S inputs of the RS flip-flops. Data at the S inputs are latched in response to an output signal of the first phase shift circuit which is fed to R inputs of the RS flip-flops. Latched data are fed to the shift register for converting to a serial signal. The serial signal, then, is low-pass-filtered to become a focus error signal.

10 Claims, 8 Drawing Sheets

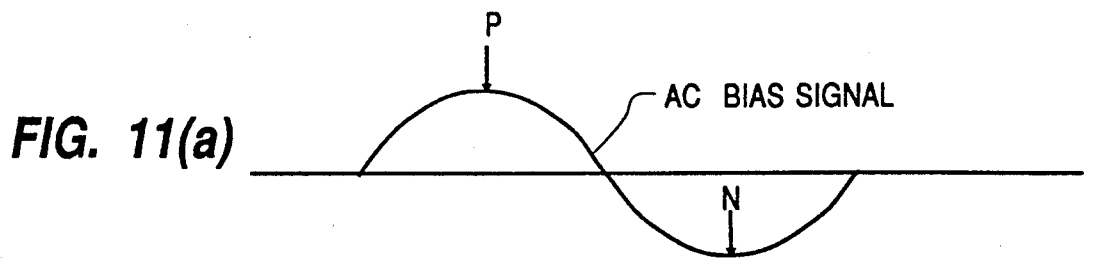
FIG. 11(a)
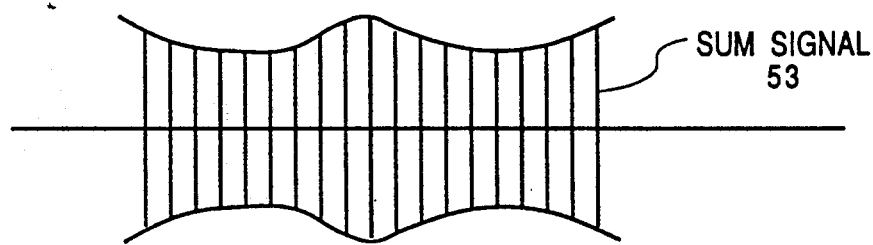
FIG. 11(b)
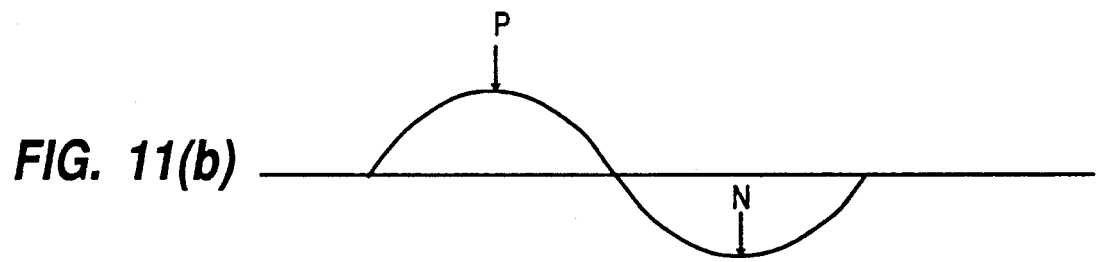
FIG. 11(c)
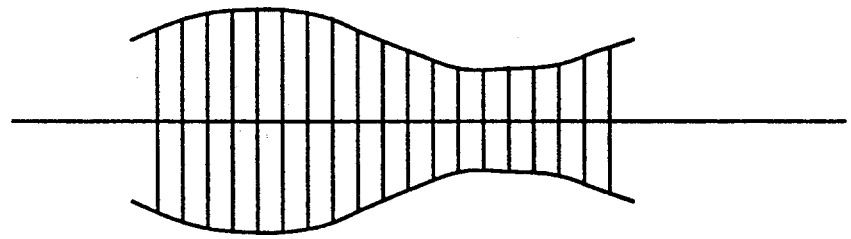
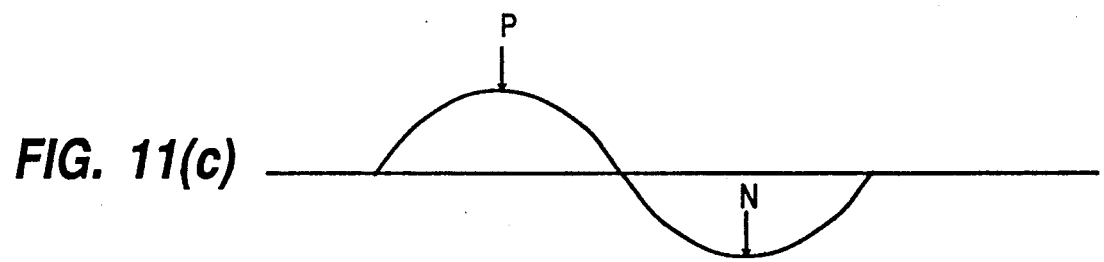
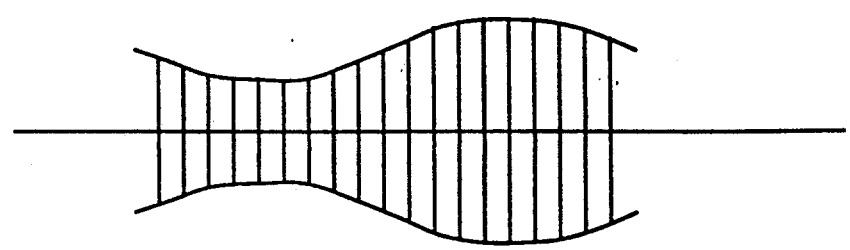

FOCUS ERROR DETECTION SYSTEM FOR AN OPTICAL RECORDING/REPRODUCING SYSTEM

BACKGROUND OF THE INVENTION

1. Field of the Invention

This invention relates to an apparatus for recording/reproducing an optical record carrier such as an optical disk which has a photo sensor composed of a plurality of elements which divide a far field image of an information pit on the record carrier, and more particularly to a focusing error detection system which obtains a focusing error signal by measuring a phase difference between outputs of the photo sensor elements.

2. Description of the Prior Art

A typical optical information recording/reproducing apparatus is disclosed in U.S. Pat. No. 4,051,527, issued Sept. 27, 1977. The apparatus derives a focusing error signal from a far field image of an information structure, which is typically composed of a plurality of pits aligned along a spiral track formed on an optical disk, or the record carrier. The apparatus comprises an optical pick-up and a phase detection circuit. The optical pick-up has a laser light source for emitting a laser light beam, an objective lens for concentrating the laser light beam on the record carrier, and a photo sensor divided into two independent elements for converting the backcoming laser light beam from the record carrier to electric signals. The phase detection circuit has a subtractor and an adder for respectively subtracting and adding the electric signals from the photo sensor elements, a phase shifter for delaying the phase of an output of the adder by 90 degrees, a multiplier for multiplying outputs of the subtractor and the phase shifter, and a low-pass filter for smoothing an output of the multiplier.

The photo sensor is attached to the optical pick-up so as to be disposed in the far field of the information structure in order that the sensor elements divide a half plane of the far field image in two. When the information structure on the optical disk is about the focal point of the objective lens of the optical pick-up, the reflected light beam from the optical disk is diffracted to a zero-order beam and higher-order beams. In the far field area, those diffraction beams, overlapping one another, produce bright and dark interference stripes the width of each of which is a function of the focus error. Furthermore, when the focused laser light beam scans the track on the record carrier (when the optical disk is rotating), the stripes also move in the parallel direction of the track image projected on the photo sensor. The direction of the movement of the stripes depends upon whether the focus error is positive or negative. For example, when the focus error is positive, that is, the distance between the information structure and the principal plane of the objective lens is longer than the focal length of the objective lens, the stripes move in the direction of the movement of the record carrier, and in the opposite case, that is, when the distance between the information structure and the principal plane of the objective lens is shorter than the focal length of the objective lens, the stripes move in the opposite direction. Such behavior of the stripes in the far field can be measured as a phase difference between outputs of the two sensor elements, which are aligned in the direction of the track image.

In the apparatus disclosed in U.S. Pat. No. 4,051,527, the phase detection circuit converts the phase difference to a DC signal, i.e., a focus error signal. The adder produces a reference signal S1 by adding the outputs of the photo sensor elements, and the subtractor produces a reference signal S2 by subtracting the output of one of the photo sensor elements from the output of the other. The phase shifter delays the phase of the reference signal S1 by 90 degrees (a quarter cycle of the reference signal S1), hereon the reference signal S1 is to be periodic. Then the multiplier multiplies the delayed reference signal S1 and the reference signal S2. The output of the multiplier is averaged by the low-pass filter.

Provided that such data composed of alternately appearing '1' and '0', i.e., 10101010101010, are recorded on the record carrier, the output of each photo sensor element is an alternating signal expressed by a sine or cosine function. In this case '1' corresponds to a pit on the record carrier. For example, outputs s1 and s2 of the two photo sensor elements can be expressed as:

$$s1 = \cos(\omega t - pd) \quad (1)$$

$$s2 = \cos(\omega t + pd) \quad (2)$$

where '$\omega$' means the angular frequency of the outputs of the photo sensor elements, and 'pd' means the phase difference as a function of the focus error. Then the reference signals S1, S2 are:

$$S1 = s1 - s2 = 2 \sin(\omega t) \sin(pd) \quad (3)$$

$$S2 = s1 + s2 = 2 \cos(\omega t) \cos(pd) \quad (4)$$

Thereafter the phase shifter gives a phase offset of 90 degrees to S2 to obtain the delayed reference signal S2':

$$S2' = 2\cos(\omega t - 90)\cos(pd) = 2\sin(\omega t)\cos(pd) \quad (5)$$

The output of the multiplier, S3, can be obtained by multiplying (3) and (5):

$$\begin{aligned} S3 &= 4\sin(\omega t)\sin(\omega t)\sin(pd)\cos(pd) \\ &= \sin(2pd)[1 - \cos(2\omega t)] \end{aligned} \quad (6)$$

The low-pass filter cuts the high frequency term to obtain an output signal Sf:

$$Sf = \sin(2pd) \quad (7)$$

This signal Sf is the focus error signal, which is almost in proportion to the phase difference when the phase difference 'pd' is small enough.

In the above-described apparatus, however, the sensitivity of the focus error detection decreases in the case that '1' and '0' are not recorded alternately on the record carrier, in other words, the distance between two successive pits (corresponding to '1') is relatively large. As a typical example, when such data as ---010000000010000000010-- are recorded on the disk, the photo sensor output signals can no more be expressed by a simple sine or cosine function as shown in the equations (1), (2). When being low-pass-filtered, the phase difference signal corresponding to the equation (4) is averaged and becomes almost zero, because the phase difference is obtained only when a transition between '1' and '0' has occurred.

In the case of ROM disks, such as video discs or digital audio discs, such a problem seldom occurs, because the run-length of record data is limited. But when applying this technique to writable/erasable disks, the problem occurs. In general, such a focus detection system as obtaining a focus error signal from the far-field image of recorded data is not suitable to the writable/erasable disks because there is no 'recorded data' on them before writing. However, this technique can be utilized for the sampling servo system with a preformatted disk. For example, U.S. Pat. No. 4,562,564 shows that servo marks for tracking servo are provided on the disk in manufacturing process. Those marks, of course, can be used for focus error detection. But, there should be a long interval between two successive marks so as to get enough recording area between those two marks. It means that it is very difficult to derive a focus error signal from a writable/erasable disk by the conventional technique even if servo marks are buried beforehand on the disk.

SUMMARY OF THE INVENTION

Accordingly it is an object of this invention to provide a focus detection system suitable to a sample-formatted writable/erasable optical record carrier.

According to the present invention, to achieve the above object, the photo sensor output signals are fed to first and second phase shift circuits respectively, the second phase shift circuit having a plurality of delay elements being connected in series, and each output of those delay elements is latched by an output of the first phase shift circuit. The serial-connected delay elements with respective output taps function as a part of a data sampler which samples an input signal at intervals of proper periods corresponding to delay factors of the delay element. Sampled data on the output taps are held after being latched.

An embodiment of the invention is characterized in that the outputs of the second phase shift circuit being composed of the delay elements having equal delay factors are fed to S inputs of RS flip-flops and the output of the first phase shift circuit is fed to R inputs of the RS flip-flops. Outputs of the RS flip-flops are fed to a shift register. The shift register sends out the outputs in series to a low-pass filter so as to obtain a focus error signal.

Another embodiment of the invention is characterized in that a part of the delay elements have variant delay factors so as to expand the dynamic range of the focus error detection.

Still another embodiment of the invention is characterized in that a focus offset can be compensated by switching the connection between the delay elements and the RS flip-flops.

Still another embodiment of the invention is characterized in that an AC signal is imposed on a focus servo loop and the focus offset is measured from the photo sensor signals the AC signal, and furthermore characterized in that the focus offset is compensated automatically.

These and other objects, features and advantageous of the present invention will be apparent from the following description taken in connection with the accompanying drawings in which:

BRIEF DESCRIPTION OF THE DRAWING

FIGS. 11(a)–11(c) are signal waveform charts for explaining the principle of the fourth embodiment.

DESCRIPTION OF THE PREFERRED EMBODIMENTS

Figure 1:
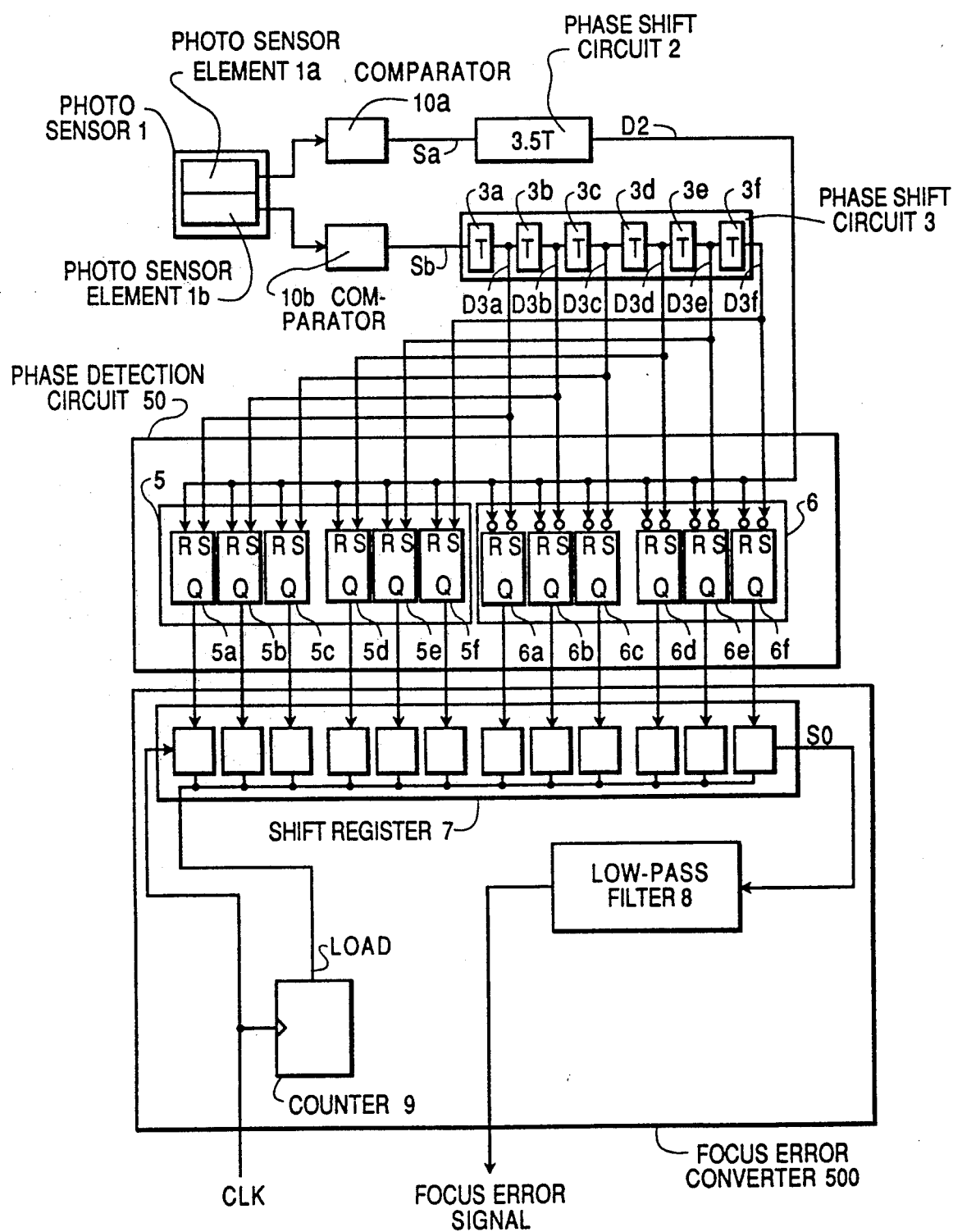
FIG. 1 is a block diagram showing a first embodiment of the invention.
Figure 2:
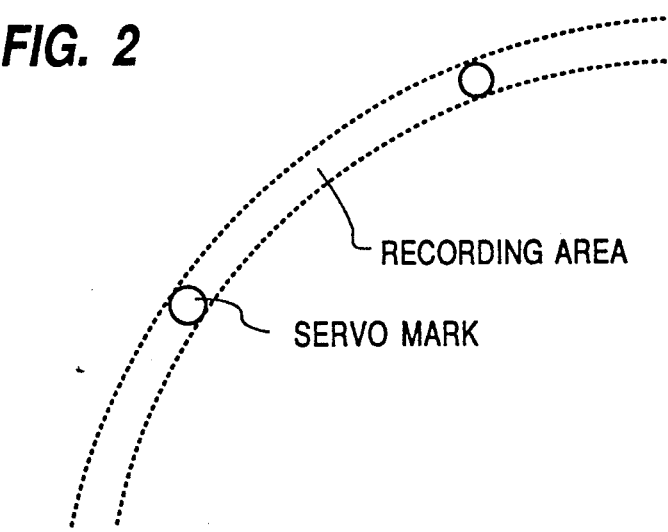
FIG. 2 is a schematic drawing showing a part of a record carrier explained in the first embodiment.

Referring first to FIG. 1, there is illustrated a focus detection system as an embodiment of the present invention. A photo sensor 1 is disposed to receive an optical flux reflected from or passed through an optical record carrier. The photo sensor 1 is a part of an optical pick-up, the other components of which are, as well-known, a laser light source, an objective lens and so on (not shown in FIG. 1). The optical flux, as well known, has been emitted from the laser light source and focused on the optical record carrier. On the record carrier, servo marks as shown in FIG. 2 have been pre-formed. The focused laser light beam is diffracted when scanning over one of the servo marks. The diffracted laser light beam then incidents on the photo sensor 1. An image projected on the photo sensor 1 is a far field image of the servo mark.

The photo sensor 1 is composed of a photo sensor element 1a and a photo sensor element 1b, which separately convert the laser light beam to electric signals. When the optical pick-up read one of the servo marks, the electric signals vary. Those electric signals are then fed to comparators 10a, 10b, which digitize the photo sensor outputs into two-level signals Sa and Sb. That is, each comparator outputs high(H) when the electric signal is beyond a threshold level, and when under the threshold level, outputs low(L). Thereafter, the digitized output Sa is fed to a phase shift circuit 2 and the output Sb is fed to a phase shift circuit 3.

The phase shift circuit 3 is constituted by delay elements 3a–3f connected in series. Each of the delay elements 3a–3f delays its input signal by a time delay of T (seconds) and transmits to the next delay element. All of the delay elements have taps for outputting delayed signals. When the delay elements 3a–3f are expressed as the 1st–6th delay elements, the n-th (n=1, 2, 3, 4, 5 or 6) delay element outputs the signal delayed by nT at its tap. That is, the taps of the delay elements 3a, 3b, 3c, 3d, 3e and 3f output the signals delayed by T, 2 T, 3 T, 4 T, 5 T and 6 T respectively.

As shown in the above description, the phase shift circuit 3 composed of the delay elements 3a–3f works as a data sampler. For example, the tap of the delay element 3f outputs the signal Sb of 6 T seconds before, while the tap of the delay element 3a the signal Sb of T seconds before. If outputs at all of those taps are latched at a proper timing, six values, sampled from the signal Sb at intervals of T, are obtained. The timing for latching the outputs of the delay elements 3a–3f is produced from the signal Sa. The phase shift circuit 2 delays the signal Sa by 3.5 T to produce a signal D2 as shown in FIG. 1. The delay 3.5 T is a center value of delays by the delay elements 3a–3f. If the delay of 3.5 T is defined as '0', in other words, if the signal D2 is defined as a reference signal, the output signal from the delay element 3a has a phase advance of 2.5 T from the reference signal and the output signal from the delay element 3f has a phase delay of 2.5 T.

All outputs of the phase shift circuits 2, 3 are fed to a phase detection circuit 50 constituted by an RS register 5 and an inverting RS register 6. All of the outputs of the delay elements 3a–3f are fed to both the RS register 5 and the inverting RS register 6. The output of the phase shift circuit 2 is also fed to the inputs of the RS register 5 and the inverting RS register 6. Outputs of the RS register 5 and outputs of the inverting RS register 6 are fed to a focus error converter 500 composed of a shift register 7, a low-pass filter 8 and a counter 9. An output of the low-pass filter 8 is a desired focus error signal.

Figure 4:
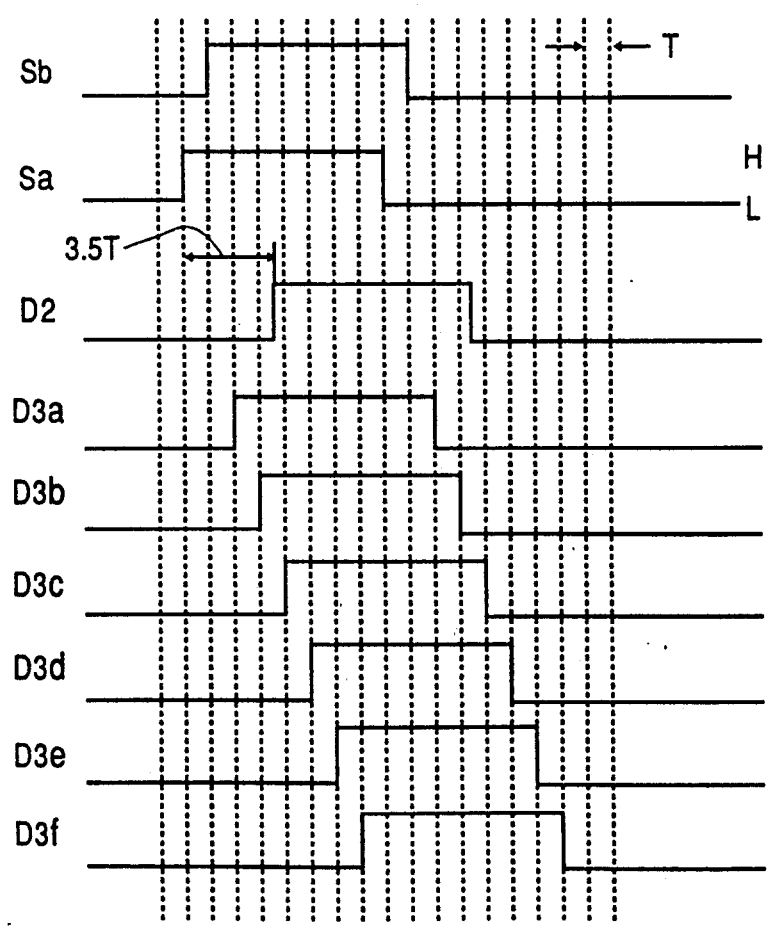
FIG. 3, FIG. 4, and FIG. 5 are signal timing charts for explaining the principle of the invention.
Figure 3A:
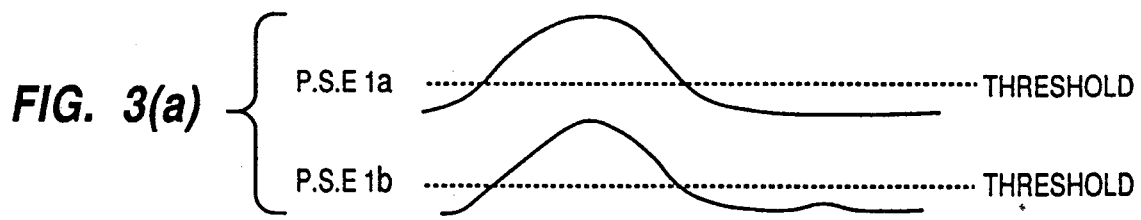
Figure 3B:
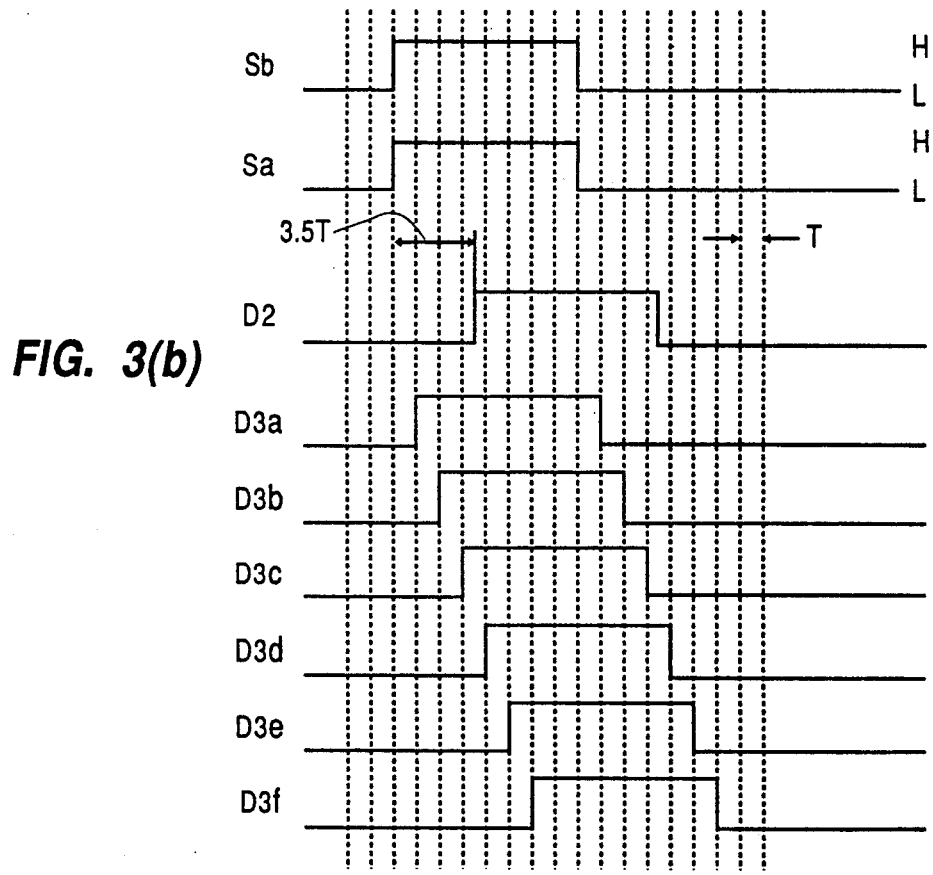
Figure 5A:
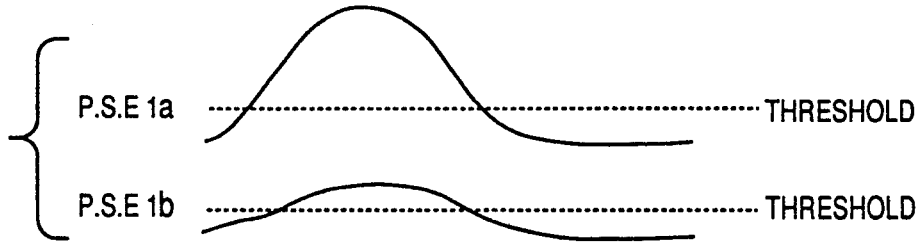
Figure 5B:
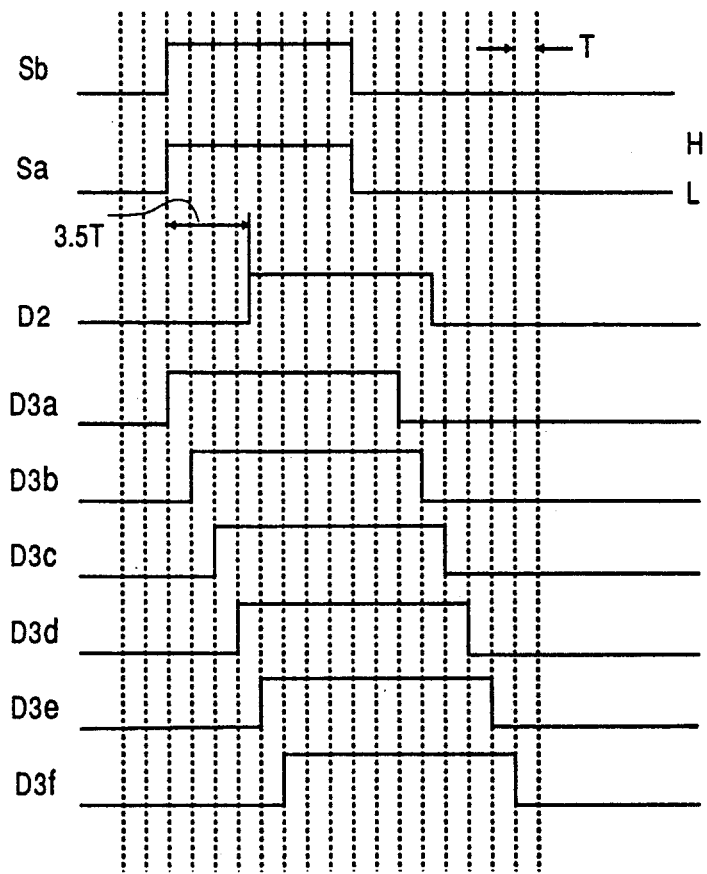

In order to better understand the invention, the function of the phase shift circuit 2 and 3 will be described with reference to FIG. 3, FIG. 4 and FIG. 5. FIG. 3 shows the outputs of the photo sensor elements (P.S.E.) 1a, 1b, the output signals Sa, Sb of the comparators 10a, 10b, the output signal D2 of the phase shift circuits 2, and the output signals D3a–D3f of the phase shift circuit 3. In FIG. 3 the positive transitions (from "L" to "H") of the signals Sa and Sb occur simultaneously and the negative transitions (from "H" to "L") of the signals Sa and Sb also occur simultaneously. In this case, there is no focus error, or the focal point of the optical pickup is just on the recording layer of the record carrier. The phase shift circuit 2 delays the signal Sa by 3.5 T to produce the signal D2. The phase shift circuit 3 composed of the delay elements 3a–3f delays the signal Sb in succession by T to produce the signals D3a–D3f with delays of T–6 T, respectively. In FIG. 3, vertical dotted lines are drawn at intervals of T. As shown in FIG. 3, the positive transitions of the signals D3a, D3b and D3c are ahead of the positive transition of the signal D2, and the positive transitions of the signals D3d, D3e and D3f are behind the positive transition of the signal D2. Similarly, the negative transitions of the signals D3a, D3b and D3c are ahead of the negative transition of the signal D2, and the negative transitions of the signals D3d, D3e and D3f are behind the negative transition of the signal D2.

The RS register 5 and the inverting RS register 6 detect the timing relations—advance or delay—of the output signals drawn in FIG. 3 for positive and negative transitions. First, the function of the RS register 5 will be described. As shown in FIG. 1, the RS register 5 is composed of RS flip-flops 5a–5f, each of which has an R input, an S input, and a Q output. When the R input of each flip-flop changes from "L" to "H" (positive transition), the RS flip-flop transmits the state of the S input to the Q output. For example, when the S input is "H" at the positive transition of the S input, the Q output becomes "H", and when the S input "L", the Q output "L". The status ("H" or "L") at the Q output does not change until the next positive transition occurs. In other words, the S input is latched at the positive transition of the S input. The S inputs of the RS flip-flops 5a–5f are fed with the signals D3a–D3f, respectively, and all of the R inputs are fed with the signal D2. As described above, the signals D3a–D3f (output signals from the delay elements 3a–3f) have been delayed from the signal Sb by T–6 T, while the signal D2 (output signal from the phase shift circuit 2) have been delayed from the signal Sa by 3.5 T. Consequently, the Q outputs of the RS flip-flops 5a–5c become "H" because the signals D3a–D3c have already changed from "L" to "H" at the positive transition of the signal D2. The Q outputs of the RS flip-flops 5d–5f become "L" because the signals D3d–D3f are still "L".

The inverting RS register 6 works at the negative transition of the signal D2. The inverting RS register 6 is composed of inverting RS flip-flops 6a–6f, each of which has an inverting R input, an inverting S input, and a Q output. Each inverting RS flip-flops inverts the logic of the S input and transmits to the Q output in response to the negative transition of the inverting R input. In this case, the inverting RS flip-flops 6a–6c output "H" and the Q outputs of the inverting RS flip-flops 6d–6f output "L" at the negative transition of the signal D2. The status of the Q outputs are latched.

When both the positive and negative transition of the signal D2 is over, all of the Q outputs of the RS register 5 and the inverting RS register 6 are latched. The state of those outputs are shown as follows:

| Q-5a | H | Q-6a | H |
|---|---|---|---|
| Q-5b | H | Q-6b | H |
| Q-5c | H | Q-6c | H |
| Q-5d | L | Q-6d | L |
| Q-5e | L | Q-6e | L |
| Q-5f | L | Q-6f | L |

In total, the number of Q outputs being "H" is 6 and the number of Q outputs being "L" is 6. It is clear that the number of flip-flops which output "H" and the number of flip-flops which output "L" are the same when there is no phase difference between the signals Sa and Sb, or when there is no focus error.

When there is a focus error, or when there is a phase difference between the signal Sa and the signal Sb, the number of flip-flops outputting "H" is not equal to the number of flip-flops outputting "L". FIG. 4 illustrates the signals Sa, Sb, D2 and D3a–3f, in the case that the signal Sb delays from the signal Sa by T. In this case, the state of the Q outputs becomes as follows:

| Q-5a | H | Q-6a | H |
|---|---|---|---|
| Q-5b | H | Q-6b | H |
| Q-5c | L | Q-6c | L |
| Q-5d | L | Q-6d | L |
| Q-5e | L | Q-6e | L |
| Q-5f | L | Q-6f | L |

In comparison with the state when there is no focus error (shown in FIG. 3), the flip-flop 5c and the inverting flip-flop 6c output "L" (In the former case, they output "H".). This is due to the phase delay of the signal Sb. As shown in FIG. 4, since the signal Sb is delayed from the signal Sa by T, the signal D3c (produced from the signal Sb by adding the phase delay of 3 T) has not changed to "H" when the signal D2 (produced from the signal Sa by adding the phase delay of 3.5 T) changes to "H". In this case, the number of Q outputs being "H" is 4 and the number of Q outputs being "L" is 8.

It is obvious that the difference of the number of "H"s from the number of "L"s represents the phase difference caused by the focus error. In the opposite case, when the signal Sb is ahead of the output Sa by T, not shown in the figure, the status of the outputs of the flip-flops becomes as follows:

| Q-5a | H | Q-6a | H |
|---|---|---|---|

| -continued | | | |
|---|---|---|---|
| Q-5b | H | Q-6b | H |
| Q-5c | H | Q-6c | H |
| Q-5d | H | Q-6d | H |
| Q-5e | L | Q-6e | L |
| Q-5f | L | Q-6f | L |

The inverting RS register 6 as well as the RS register 5 is necessary because the pulse widths of the signals Sa and Sb tend to vary in accordance with the amplitudes of the photo sensor signals. FIG. 5 illustrates typical examples of the photo sensor signals and digitized signals. The pulse width of the signal Sb is larger than that of the signal Sa. The rising edge of the signal Sb is in advance of the rising edge of the signal Sa, but the falling edge of the signal Sb is behind the falling edge of the signal Sa. In total, there is no phase difference. In this case, the status of the outputs of the flip-flops becomes as follows:

| Q-5a | H | Q-6a | H |
|---|---|---|---|
| Q-5b | H | Q-6b | H |
| Q-5c | H | Q-6c | L |
| Q-5d | H | Q-6d | L |
| Q-5e | L | Q-6e | L |
| Q-5f | L | Q-6f | L |

Four RS flip-flops (5a, 5b, 5c and 5d) output "H", and two inverting flip-flops (6a and 6b) output "H". In total, six flip-flops output "H". As a result, no phase error (focus error) is detected. If the inverting RS register 6 were omitted, false phase error, that is, phase advance of the signal Sb, would be detected.

Next, a technique to derive the focus error signal from those outputs of the flip-flops will be described. Both outputs of the RS register 5 and outputs of the inverting RS register 6 are converted to the focus error signal by a focus error converter 500 constituted by a shift register 7, a low-pass filter 8 and a counter 9. As shown in FIG. 1, the outputs of the RS flip-flops 5a–5f and the outputs of the inverting RS flip-flops 6a–6f are fed to parallel inputs of the shift register 7. Those data are loaded in response to a control signal "LOAD". Thereafter, they are shifted and wiped out bit by bit in succession being synchronized with a clock signal "CLK". At a serial output "SO" of the shift register 7, the data, "H" or "L", appear sequentially. The control signal "LOAD" is produced by the counter 9. The counter counts the clock signal "CLK" up to twelve—the number of the flip-flops—and then output the control signal "LOAD". Thereafter the counter resets itself and repeat the operation. In the case that there is a long interval between two successive servo marks, the shift register 7 continues to repeat: loading—shifting—wiping-out—and loading until the optical pick-up read the next servo mark and the outputs of the RS register 5 and the inverting RS registers 6 are ready for the next data.

The low-pass filter 8 cuts high frequency terms in the output of the shift register 7 in order to get a DC signal. When "L" corresponds to 0 (volt) and "H" to 1 (volt), the final output becomes 0.5 (volts) when there is no focus error (because the number of "H"s and the number of "L"s are the same). The output, of course, increases or decreases from 0.5 in accordance with the focus error.

By the way, in the case that this system is applied for a digital servo system, the shift register and the low-pass filter may be omitted. As described above, the number of RS flip-flops or inverting RS flip-flops outputting "H" represents the focus error. Consequently, if the outputs of "H" are summed, a numerical value representing a focus error is obtained. For example, when there is no focus error, the numerical value "6" is outputted in the case that the total number of the RS flip-flops and the inverting RS flip-flops is twelve.

Figure 6:
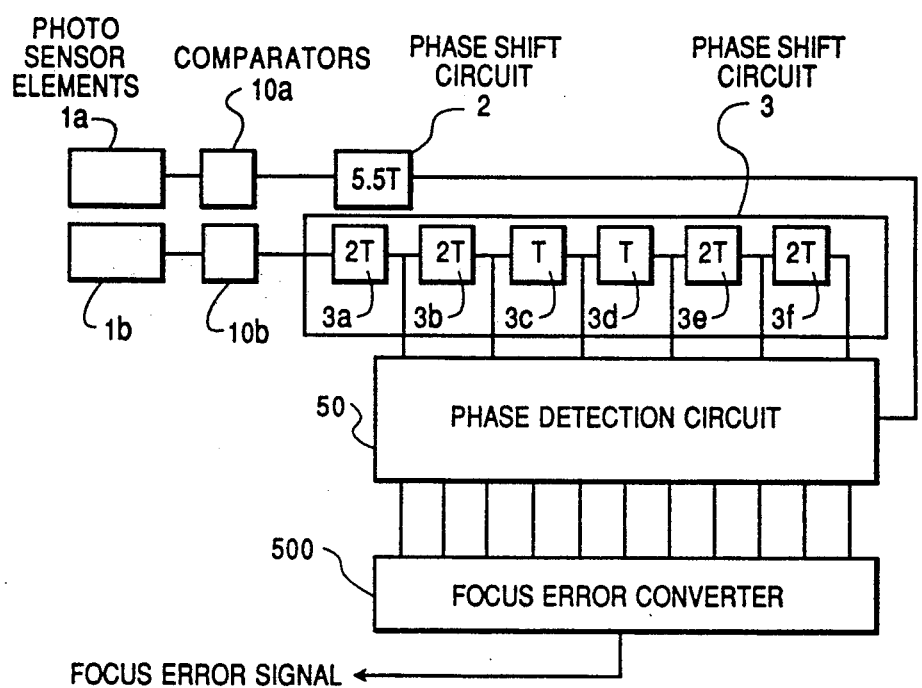
FIG. 6 is a block diagram showing a second embodiment of the invention.
Figure 7:
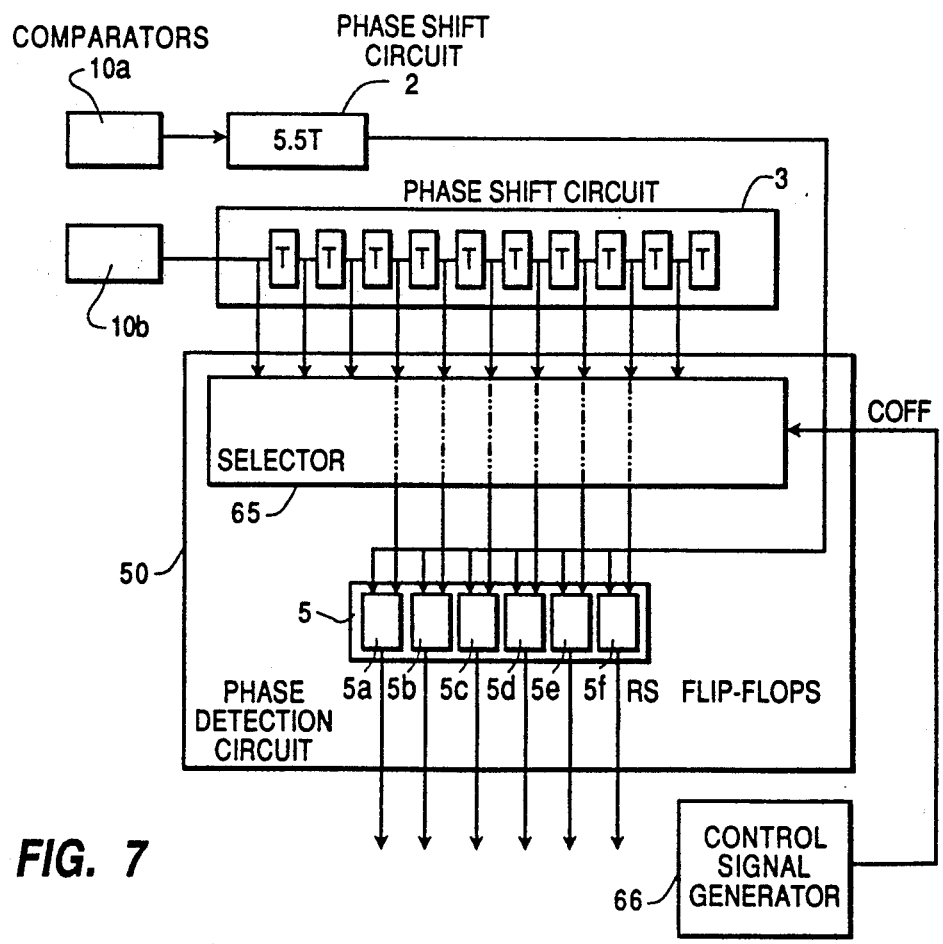
FIG. 7 is a block diagram showing a third embodiment of the invention.

A second embodiment of the present invention will now be described. FIG. 6 is a block diagram of the second embodiment. The number of RS flip-flops (or inverting RS flip-flops) determines the accuracy or the dynamic range of the focus error detection. The larger the number is, the more accurately or the more widely the focus error can be measured. But from the practical point of view, such cases often occur as the focus detection system is not allowed to equip a large number of flip-flops. In that case, when the system needs accuracy, wide dynamic range will not be attained, and on the other hand, when the system needs dynamic range, accuracy should be sacrificed.

In this embodiment, the phase shift circuit 3 is constituted by delay elements 3a, 3b, 3c, 3d, 3e and 3f which have the delay factors of 2T,2T,T,T,2T and 2T respectively, and the phase shift circuit 2 delays the signal Sa by 5.5T. This embodiment intends not only to expand the dynamic range of the focus error detection but also to have the accuracy without increasing the number of the flip-flops. When the detected focus error is larger than a range that the delay elements 3c and 3d can cover, the focus error is evaluated more roughly. But for the focusing servo system, the accuracy only about a just-focusing point is necessary. The focus error signal at the point far from the just-focusing point is used only when there is a strong disturbance. Therefore, the number of the delay elements for the large focus error can be reduced without sacrificing the accuracy of the focusing servo.

A third embodiment of the present invention will now be described. FIG. 8 is a block diagram of the third embodiment. In this embodiment, the number of the delay elements 3a–3j is ten while the number of RS flip-flops 5a–5f is six. Six R inputs of the RS flip-flops 5a–5f are connected to six of twelve outputs of the delay elements 3a–3j by means of a selector 65. In order to simplify the explanation, only members responsible for the positive transitions will be described. So descriptions concerning the inverting RS register 6, which is actually present, is omitted here.

This embodiment introduces a compensation technique for focusing servo offset. In ideal cases as shown above, when the laser light beam from the optical pick-up focuses on the record carrier, no phase error yields. When a focus servo loop, composed of the objective lens, the focus detection system and the focus actuator, is under operation, the phase error is suppressed to zero. At that time, the focusing actuator follows the deviation of the moving record carrier, keeping the focal point just on the record carrier.

But in general cases, there exists a focus offset, that is, there is a constant error between the measured focus error and the actual focus error (an error between the record carrier and the focal point of the objective lens). That is, there exists a phase error between the signals from the photo sensor elements 1a and 1b even though the laser beam just focuses on the record carrier. The phase error is detected as a wrong focus error signal (a focus error signal including a focus offset). Therefore, the focusing feed-back loop tries to suppress the phase error by keeping the focused laser beam spot off the record carrier.

The phase error which yields a focus offset is caused by pit-depth deviation on the record carrier. In the former embodiments, it was described that output signals from the photo sensor elements are in the same phase when there is no (actual) focus error. But, in detail, there is no phase difference only when the servo marks on the record carrier fulfill one of the two conditions below. One is that depth of the servo marks is just a multiple of a quarter wavelength of the laser light beam emitted from the optical pick-up. The other is that the servo marks are distinguished from surrounding area by reflective index, shortly speaking, "black marks" are printed on "white ground" of the record carrier.

But in the cases that the servo marks are formed as pre-pits which are distinguished from the surrounding area by height and furthermore that the height is not a multiple of a quarter wavelength of the laser light beam, phases of the output signals from the photo sensor elements are not the same even though there is no actual focus error.

Figure 8A:
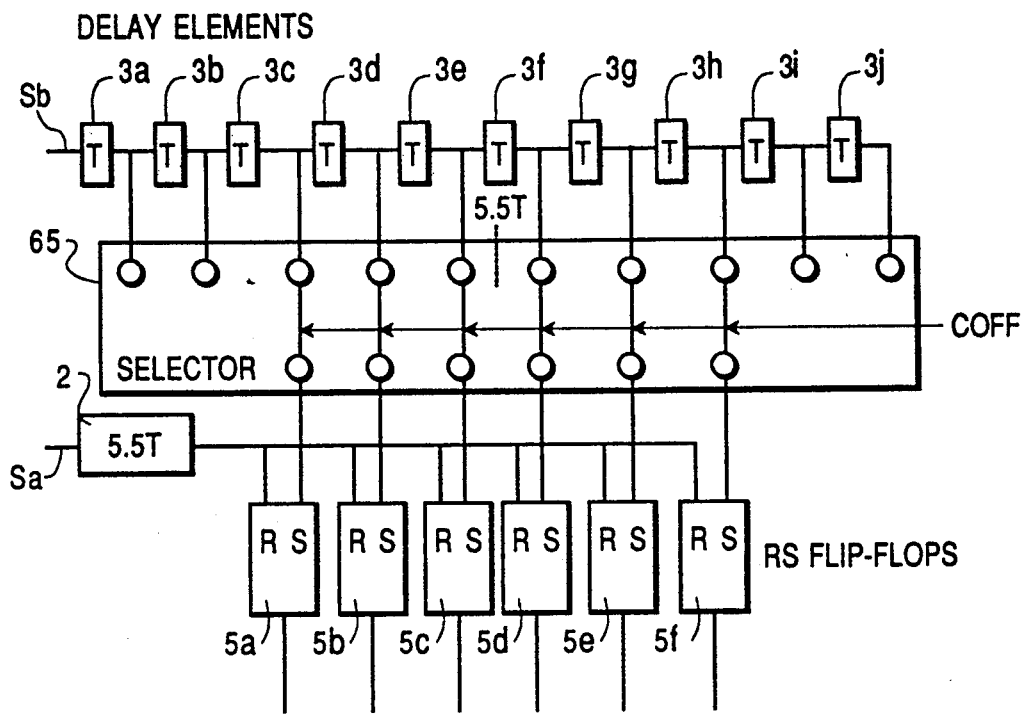
FIGS. 8(a) and 8(b) are diagrams for explaining the principle of the third embodiment.

The phase offset, which causes the focus offset, can be canceled by adding a reverse phase offset to either one of the photo sensor output signals. In this embodiment, it is possible to add the reverse phase offset which cancel the phase offset by shifting the connection between the delay elements $3a-3j$ and the RS flip-flops $5a-5f$. As shown in FIG. 8(a), when neither phase delay nor phase advance is expected, the RS flip-flops $5a-5f$ are connected with outputs of the delay elements $3c-3h$. Since the delays of the S inputs of the flip-flops $5a-5c$ are 3T,4T and 5T while the delays of the R inputs are 5.5T, the flip-flops $5a-5c$ output "H" when there is no phase difference between the input signals Sa and Sb.

Figure 8B:
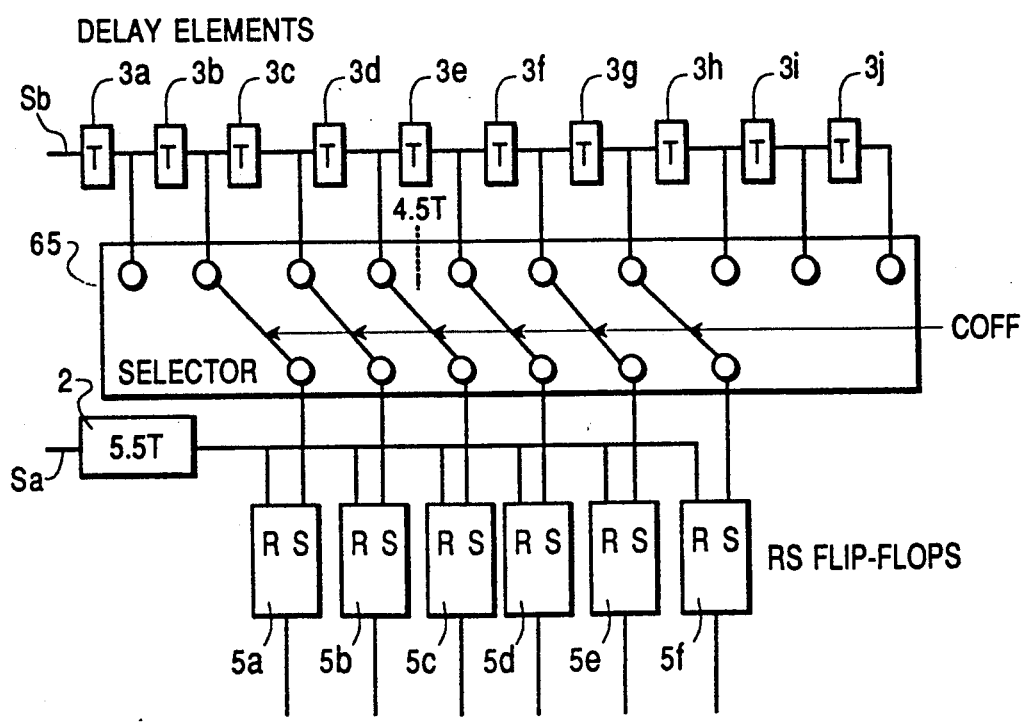

When there needs phase compensation for removing the focus offset, a proper phase delay or advance is added by switching the connection between the delay elements $3a-3j$ and the RS flip-flops $5a-5f$. FIG. 8(b) shows an example to advance the phase of the signal Sb by T. In FIG. 8(b), the RS flip-flops $5a-5f$ are connected with outputs of the delay elements $3b-3g$. When there is no phase difference between the input signals Sa and Sb the flip-flops $5a-5d$ output "H" because the delay of the S input of the flip-flop $5d$ is 5T (smaller than 5.5T). In this case, when the signal Sb delays from Sa by T due to the offset, the RS flip-flops $5a-5f$ output no phase error.

Figure 9:
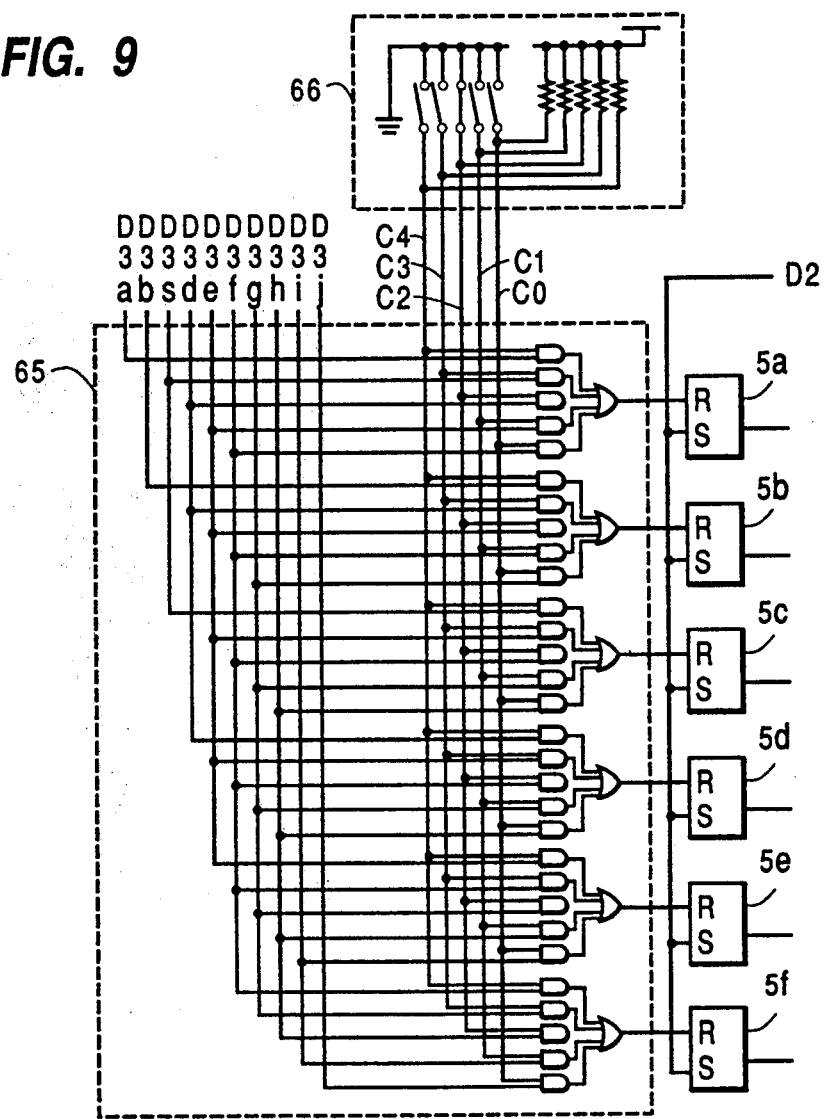
FIG. 9 is a circuit diagram showing a part of the third embodiment.

In addition, the selector 65 are so designed as to be controlled to shift the parallel connections in proper degrees (by a step of T) in accordance with an offset control signal "COFF", which is supplied by a control signal generator 66. FIG. 9 shows an example of the selector 65 and the control signal generator 66. In FIG. 9, the selector 65 is composed of AND-OR gates and the control signal generator 66 is composed of switches and resisters. The offset control signal "COFF" is a 5-bit binary code "c0c1c2c3c4". When "COFF" is "00100", the connection between the delay elements $3a-3g$ and the RS flip-flops $5a-5f$ is in neutral position (as shown in FIG. 8(a)), in other words, neither phase delay nor advance is added. The degrees of switch-shifting corresponding to "COFF" are described as follows.

| c0 | c1 | c2 | c3 | c4 | steps |
|----|----|----|----|----|-------|
| 0 | 0 | 0 | 0 | 1 | −2T |
| 0 | 0 | 0 | 1 | 0 | −1T |
| 0 | 0 | 1 | 0 | 0 | 0 |
| 0 | 1 | 0 | 0 | 0 | 1T |
| 1 | 0 | 0 | 0 | 0 | 2T |

"T" is a delay factor of each of delay elements $3a-3j$. In this embodiment, the phase offset corresponding to the focus offset can be canceled if the absolute value of the phase offset is within 2T.

In reference to a well-known technique, an offset is removed electrically. For example, a signal having offset is fed to one of inputs of an analog subtractor and a DC signal produced by a variable voltage generator is fed to the other of the inputs. An output signal of the subtractor will not have the offset when the DC signal is adjusted properly. In the third embodiment the selector 65 functions as the subtractor and the control signal generator 66 as the variable voltage generator. Then, the offset control signal "COFF" corresponds to the DC signal in the well-known technology. The technology shown in this embodiment has a merit that the offset control signal "COFF" is a digital code, which can be provided by a microprocessor.

Figure 10:
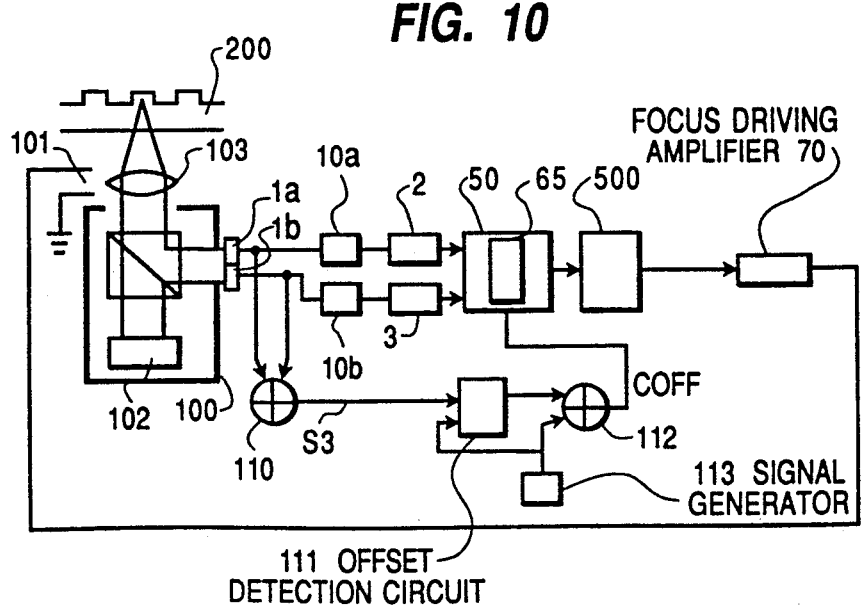
FIG. 10 is a block diagram showing a fourth embodiment of the invention.

The fourth embodiment of the present invention will now be described. FIG. 10 is a block diagram of the fourth embodiment. This embodiment shows one of the technique for compensating the focus offset automatically. An optical pick-up 100 has a focusing actuator 101 with an objective lens 103, a laser light source 102, and the photo sensor elements $1a$, $1b$. A laser light beam emitted from the laser light source 102 focuses on the recording layer of an optical record carrier 200. Then the photo sensor elements $1a,1b$ convert the reflected light beam from the record carrier to electric signals. The circuitry constituted by the comparators $10a,10b$, phase shift circuits 2,3, the phase detection circuit 50 and the focus error converter 500 derives the focus error signal as described before. Thereafter, the focus error signal being low-pass-filtered is fed back to the focusing actuator 101 after being amplified properly by a focus driving amplifier 70. Those are the typical functions of the focusing servo loop.

Furthermore, in this embodiment, there is another feedback loop. An adder 110 adds the photo sensor output signals to produce a sum signal S3 (also called "reproduced signal"), which is fed to an offset detection circuit 111. The sum signal S3, being in proportion to the total light power illuminating on the photo sensor elements $1a,1b$, varies when the optical pick-up reads the pits on the record carrier. When there is no focus offset, the sum signal S3 is in maximum amplitude while the focusing feedback loop is in operation. The focus offset can be measured and compensated by monitoring the envelope of the sum signal S3. A signal generator 113 generates an AC bias signal the frequency of which is far lower than the cut-off frequency of the focusing feedback loop. The offset detection circuit 111 detects the focus offset from the AC bias signal and the envelope of the sum signal S3 as described later. The measured focus offset is fed to an adder 112. The adder 112 adds the measured focus offset signal and the AC bias signal and the output is fed as "COFF" to the selector 65 of the phase detection circuit 50. The phase detection circuit 50 has the same constitution as shown in the third embodiment.

FIG. 11 illustrates the principle of the offset detection FIG. 11(a) shows the case that there is no focus offset. When the AC bias signal is compulsorily imposed on the focusing feedback loop, the envelope of the sum signal S3 varies as shown in FIG. 11(a). Since the focal point of the optical pick-up moves symmetrically about the recording layer of the optical record carrier 200, the amplitude of the sum signal S3 is the largest when the AC bias signal is zero. On the other hand, when the AC bias signal is at a positive peak value (P in the figure) and a negative peak value (N in the figure), the amplitudes of the sum signal S3 at those values P and N are equal to each other. FIG. 11(b) and FIG. 11(c) show the AC bias signals and the sum signals when there exist focus offsets, which are in the opposite direction to each other. In FIG. 11(b), when the AC bias signal is at the value P, the sum signal S3 takes its maximum value. In FIG. 11(c), when the AC bias signal is at the value N, the sum signal S3 takes its maximum value. Therefore, by comparing the amplitudes of the envelope of the sum signal at the values P and N, the focus offset can be measured. For example, by subtracting the amplitude of the envelope at the value P from the amplitude of the envelope at the value N and holding the difference in one cycle of the AC bias signal, the offset can be measured as a DC signal.

Once the offset is measured, it can be suppressed by the feedback loop. The measured focus offset signal is fed to the focus offset control terminal after converted to the control signal "COFF", which has been explained in the third embodiment. A proper amount of the phase offset is compensated in accordance with the control signal "COFF" by the selector 65 as described in the third embodiment. Since the loop is a negative feedback loop, the offset will be suppressed completely.

However, the imposed AC bias signal still remains. The AC bias signal should be eliminated after the offset adjustment has been finished. Besides, the focusing servo will continue to be fluctuated by the AC bias signal.

In the embodiment, the amplitudes of the sum signal are measured for detecting the focus offset. There is, of course, other ways for detecting the focus offset. For example, the offset detection circuit can measure an error rate of the sum signal. The error rate is relevant to the magnitude of the sum signal. When the magnitude of the signals is small in comparison of the noise, the error rate is high. In general cases, before recording data on the record carrier, error correction codes are added to the data. When reproducing those data, errors can be detected and corrected. The more the errors are in the sum data, the more frequently the errors are detected and corrected. Therefore, by monitoring the error rate instead of the amplitude of the sum signal, the focus offset can be detected.

What is claimed is:

1. An apparatus for detecting a focus error from a far field image of a pre-formed pit on a record carrier, said apparatus comprising:
   first photo sensor means and second photo sensor means for converting a light beam being reflected from or being passed through said record carrier to electric signals, said first and second photo sensor means being disposed separately in the far field light path;
   digitizing means for digitizing said electric signals from said first and second photo sensor means to obtain first and second digital signals;
   phase shift means having a plurality of delay elements connected in series having output taps respectively for delaying phase of said second digital signal;
   latch means triggered by said first digital signal for latching outputs of said delay elements respectively; and
   output means for outputting a focus error signal corresponding to the number of outputs of said latch means indicating high or low level.

2. An apparatus according to claim 1, wherein said output means comprises a shift register for converting outputs of said latch means to a serial signal, and a low-pass filter for cutting high frequency terms of the serial signal from said shift register.

3. An apparatus according to claim 1, wherein a part of the delay elements have variant delay factors for expanding a dynamic range of the focus error detection.

4. An apparatus according to claim 1, wherein said latch means comprises RS flip-flops, S inputs of said RS flip-flops being fed by outputs of said delay elements, R inputs of said RS flip-flops being triggered by said first digital signal.

5. An apparatus according to claim 1, further comprising selector means provided between said phase shift means and said latch means for switching connections between said RS flip-flops and said delay elements.

6. An apparatus for recording or reading data to/from a record carrier having formed thereon preformed pits, being equipped with a light source means for emitting a laser light beam, an objective lens for focusing said laser light beam on said record carrier, and a focusing actuator for moving said objective lens toward focusing direction, said apparatus comprising:
   first photo sensor means and second photo sensor means for converting a light beam being reflected from or being passed through said record carrier to electric signals, said first and second photo sensor means being disposed separately in a far field light path and outputting a first signal and a second signal, respectively;
   focus detection means for detecting a phase difference between said first and second signals to produce a focus error signal indicative of said phase difference;
   focusing feed-back means for feeding said focus error signal to said focusing actuator;
   offset control signal generating means for detecting a focus offset from said first and second signals and producing an offset control signal indicative of said focus offset; and
   phase shift means for delaying or advancing phase of said second signal according to said offset control signal.

7. An apparatus according to claim 6, wherein said offset control signal generating means comprises:
   first adder means for adding said first and second signals to produce a sum signal;
   signal generation means for generating a time varying signal;
   offset detection means for deriving an offset detection signal from said sum signal and said time varying signal; and
   second adder means for adding said offset detection signal and said time varying signal to produce said offset control signal.

8. An apparatus according to claim 7, wherein said offset detection means derives said offset detection signal from said sum signal at a positive peak and a negative peak of said time varying signal.

9. An apparatus for detecting a phase error between a first digital signal and a second digital signal, said apparatus comprising:
  phase shift means having a plurality of delay elements connected in series having output taps respectively for delaying or advancing phase of said second digital signal;
  latch means triggered by said first digital signal for latching outputs of said delay elements; and
  output means for outputting a phase error signal corresponding to the number of outputs of said latch means indicating high or low level.

10. An apparatus according to claim 9, wherein said latch means comprises RS flip-flops, S inputs of said RS flip-flops being fed by outputs of said delay elements, R inputs of said RS flip-flops being triggered by said first digital signal.

* * * * *